(12) United States Patent
    Davis et al.

(10) Patent No.: US 9,969,504 B1
(45) Date of Patent: May 15, 2018

(54) AUTOMATED MULTI-PLANE PROPULSION SYSTEM

(71) Applicant: The United States of America, as represented by the Secretary of the Navy, Washington, DC (US)

(72) Inventors: Raymond Lawson Davis, Kanagawa-Ken (JP); Patrick Alan Livesay, Suffolk, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 305 days.

(21) Appl. No.: 15/082,255

(22) Filed: Mar. 28, 2016

Related U.S. Application Data

(60) Provisional application No. 62/215,305, filed on Sep. 8, 2015.

(51) Int. Cl.
    *B64F 1/04*      (2006.01)
    *B64C 39/02*     (2006.01)

(52) U.S. Cl.
    CPC .............. *B64F 1/04* (2013.01); *B64C 39/024* (2013.01); *B64C 2201/021* (2013.01); *B64C 2201/08* (2013.01)

(58) Field of Classification Search
    CPC . B64F 1/04; B64C 2201/02; B64C 2201/021; B64C 39/024
    See application file for complete search history.

(56) References Cited

U.S. PATENT DOCUMENTS

| | | | |
|---|---|---|---|
| 1,960,719 A | 2/1931 | Stibbs | |
| 2,426,437 A * | 8/1947 | Cole | F41B 3/005 124/21 |
| 2,708,431 A * | 5/1955 | Walker | F41B 3/02 124/22 |
| 3,068,612 A * | 12/1962 | Simpson | A63H 27/00 446/65 |
| 3,496,580 A * | 2/1970 | Gulmon | F42B 12/68 102/504 |
| 3,568,191 A * | 3/1971 | Hiester | F42B 12/02 342/8 |
| 3,724,319 A * | 4/1973 | Zabelka | F41H 11/14 102/403 |

(Continued)

*Primary Examiner* — Justin M Benedik
(74) *Attorney, Agent, or Firm* — Naval Postgraduate School; James B. Potts

(57) ABSTRACT

Provided here is a UAV launcher generally comprising a launcher frame, first rail guide, second rail guide, and a conveyor system comprising a conveyor, where the first rail guide, second rail guide, and some portion of the conveyor are typically substantially parallel, and where the first and second rail guide typically extend beyond the driver wheel of the conveyor system in a launching direction. The driver wheel and driven wheel of the conveyor system rotate on axes generally perpendicular to the first and second rail guide. A DC motor is coupled to the driver wheel and generates rotation of the driver wheel, and correspondingly governs the linear velocity of the conveyor. A motor controller is configured to control the RPM of the DC motor using a motor speed profile and a wedge interface coupled to the transmission drive motivates a loaded UAV to a launching velocity such that the UAV achieves airborne operation.

19 Claims, 7 Drawing Sheets

(56) References Cited

U.S. PATENT DOCUMENTS

| | | | |
|---|---|---|---|
| 4,060,930 A * | 12/1977 | Hirtle | A63H 27/14 446/65 |
| 4,294,157 A * | 10/1981 | Stancil | F42B 12/68 102/504 |
| 4,664,253 A | 5/1987 | Fahrion et al. | |
| 4,683,797 A * | 8/1987 | Wittbrodt | F42D 1/04 89/1.13 |
| 4,776,255 A * | 10/1988 | Smith | F41H 11/14 89/1.11 |
| 5,060,413 A * | 10/1991 | Garcia | A01K 91/02 43/19 |
| 5,104,281 A | 4/1992 | Corvi | |
| 5,392,755 A * | 2/1995 | Sutton | A63H 27/14 124/4 |
| 5,417,139 A * | 5/1995 | Boggs | F41H 11/14 102/504 |
| 5,448,937 A * | 9/1995 | Buc | F42B 12/68 102/402 |
| 5,695,153 A | 12/1997 | Britton et al. | |
| 5,965,836 A * | 10/1999 | Rakov | F42B 15/00 102/374 |
| 6,074,265 A * | 6/2000 | Barthold | A63H 27/00 446/61 |
| 6,176,367 B1 | 1/2001 | Patrito | |
| 6,457,673 B1 * | 10/2002 | Miller | B64F 1/06 244/63 |
| 6,679,155 B1 * | 1/2004 | Yaschur | F41A 1/04 124/56 |
| 6,851,647 B1 * | 2/2005 | Rosenbaum | B64F 1/06 244/63 |
| 7,210,654 B1 * | 5/2007 | Cox | B64C 39/024 244/190 |
| 7,318,565 B2 * | 1/2008 | Page | B64C 39/024 244/54 |
| 8,511,607 B2 | 8/2013 | Robinson | |
| 2006/0226284 A1 * | 10/2006 | Poesch | A63H 27/005 244/63 |

* cited by examiner

AUTOMATED MULTI-PLANE PROPULSION SYSTEM

RELATION TO OTHER APPLICATIONS

This patent application claims priority from provisional patent application 62/215,305 filed Sep. 8, 2015, which is hereby incorporated by reference in its entirety.

FIELD OF THE INVENTION

One or more embodiments relates to a UAV launcher comprising a conveyor system and conveyor for the acceleration of a UAV from rest to a launching velocity.

BACKGROUND

Utilization of unmanned aerial vehicles (UAVs) is rapidly increasing in private, commercial, and military applications. These aircraft are powered aerial vehicles capable of flight either under human control or autonomously, and may be designed to function as traditional rotary wing, multi-rotor, or fixed-wing platforms. UAVs are frequently deployed in efforts related to search and rescue, meteorological assessments, traffic surveillance, agricultural crop monitoring, and others, and are capable of performing highly diverse and increasingly complicated missions. Mechanisms for safe and effective launching is a significant area of current interest and a variety of means have been employed, including horizontal take-off and landing (HTOL) when a prepared surface is available, catapulted or zero-length rocket-powered launches when runways are precluded, and vertical take-off and landing (VTOL). In generally limited cases hand-launching may be employed if the UAV is sufficiently light and has a sufficiently low stall speed.

A developing mission area that is of particular interest to many entities in the defense and commercial sectors is that of UAV swarming, which requires multiple UAVs to be launched in a relatively short period of time. Under these scenarios, the launcher must provide sufficient force for launch in a relatively fast cycle in order to maximize the usability of the entire swarm once airborne. Further, if such a launch is intended from relatively remote areas, the launcher needs to provide this with relatively compact, transportable design and with a relative minimum of force-bearing components to enhance reliability. Additionally and ideally, the launcher should require a minimum of consumables such as compressed air canisters or other motive means in order to enhance its overall portability and operational independence.

Provided here is a UAV launcher system capable of launching multiple UAVs in rapid succession using a conveyor system mechanism, where the conveyor system mechanism is driven by a DC motor controlled by a motor controller. The motor controller is typically an intelligent motor controller capable of issuing speed commands based on software instructions, so that the linear velocity of the conveyor system may be controlled within strict parameters. A UAV is motivated over rail guides and to launch by a wedge interface coupled to the conveyor. The motor controller drives the DC motor through a motor speed profile in order to accelerate the DC motor and conveyor to a specific launching velocity over a launch length defined by the frame of the UAV launcher and the placement of the driver and driven wheels thereon. A UAV is motivated over rail guides and to launch by a wedge interface coupled to the conveyor in a manner which typically observes acceleration limits dictated by the UAV. The UAV launcher thereby provides an effective means to accelerate a UAV to a launching velocity under defined limits in a manner which provides for operator safety and rapid successive operation, in order to support operations requiring multiple UAVs to be launched in a relatively short period of time.

These and other objects, aspects, and advantages of the present disclosure will become better understood with reference to the accompanying description and claims.

SUMMARY

The disclosure provides a UAV launcher generally comprising a launcher frame, first rail guide, second rail guide, and a conveyor system comprising a conveyor, where the first rail guide, second rail guide, and some portion of the conveyor are typically substantially parallel, and where the first and second rail guide typically extend beyond the driver wheel of the conveyor system in a launching direction. Typically, the driver wheel and driven wheel of the conveyor system rotate on axes generally perpendicular to the first and second rail guide. A DC motor is coupled to the driver wheel and generates rotation of the driver wheel, and correspondingly governs the linear velocity of the conveyor. A motor controller is configured to control the RPM of DC motor using a motor speed profile to ultimately control the linear velocity of the conveyor to provide a launching velocity over the launching length L, while additionally observing acceleration limits. A wedge interface is coupled to the transmission drive and utilized to motivate a UAV to the launching velocity during launch, such that the UAV ejects from the UAV launcher and achieves airborne operation.

The UAV launcher utilizes a motor controller capable of commanding motor speed as a function of time in order to increase the RPM of the DC motor and generate a linear velocity of the wedge interface equal to a launching velocity over a launching length. In certain embodiments, the motor controller is a digital device capable of executing instructions input by software programming. The resulting motor speed profiles which generate the launching velocity within the pertinent limiting restrictions may be achieved through stepped motor speeds or other available descriptions of motor speed such as acceleration rate or other parameters. Additionally, an automatic reset function may be facilitated through software timing to decelerate and stop the conveyor and wedge interface at a consistent point between launch evolutions, to facilitate rapid loading and launching of multiple UAVs in succession.

In typical operation a UAV is loaded on the UAV launcher in a position in contact with the wedge interface and with first and second rail guides interposed between the wings of the UAV and the conveyor. The DC motor rotates the motor shaft at a motor shaft RPM and the motor shaft generates a driver wheel RPM, with the driver wheel RPM proportional to the motor shaft RPM and generating a linear velocity of the conveyor and wedge interface. The motor controller increases the motor shaft RPM using a motor speed profile, where the motor speed profile begins at zero RPM and subsequently increases the motor shaft RPM to generate the linear velocity of the conveyor and wedge interface equal to the launching velocity as the wedge interface displaces a distance equal to the launching length. This correspondingly displaces the UAV to the launching velocity over the launching length.

The novel apparatus and principles of operation are further discussed in the following description.

Embodiments in accordance with the invention are further described herein with reference to the drawings.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a UAV launcher incorporating a conveyor system and conveyor to motivate a loaded UAV and achieve launching velocity.

The disclosure provides a UAV launcher generally comprising a launcher frame, first rail guide, second rail guide, and a conveyor system comprising a conveyor extending between a driver wheel and a driven wheel, where the first rail guide, second rail guide, and some portion of the conveyor are typically substantially parallel and the first and second rail guide typically extend beyond a driver wheel of the conveyor system in a launching direction. Typically, the driver wheel and driven wheel of the conveyor system rotate on axes generally perpendicular to the first and second rail guide. A DC motor is coupled to the driver wheel and generates rotation of the driver wheel, and correspondingly governs the linear velocity of the conveyor. A motor controller is configured to control the RPM of DC motor using a motor speed profile to ultimately control the linear velocity of the conveyor to provide a launching velocity over the launching length L, while additionally observing acceleration limits. A wedge interface is coupled to the transmission drive and utilized to motivate a UAV to the launching velocity during launch, such that the UAV ejects from the UAV launcher and achieves airborne operation. In certain embodiments, the motor controller is a digital device capable of executing instructions input by software programming and provides motor speed profiles through successively stepped motor speeds or other available descriptions. In some embodiments, an automatic reset function is facilitated through software timing to decelerate and stop the conveyor between launch evolutions in order to facilitate rapid loading and launching of multiple UAVs in succession.

Figure 1:
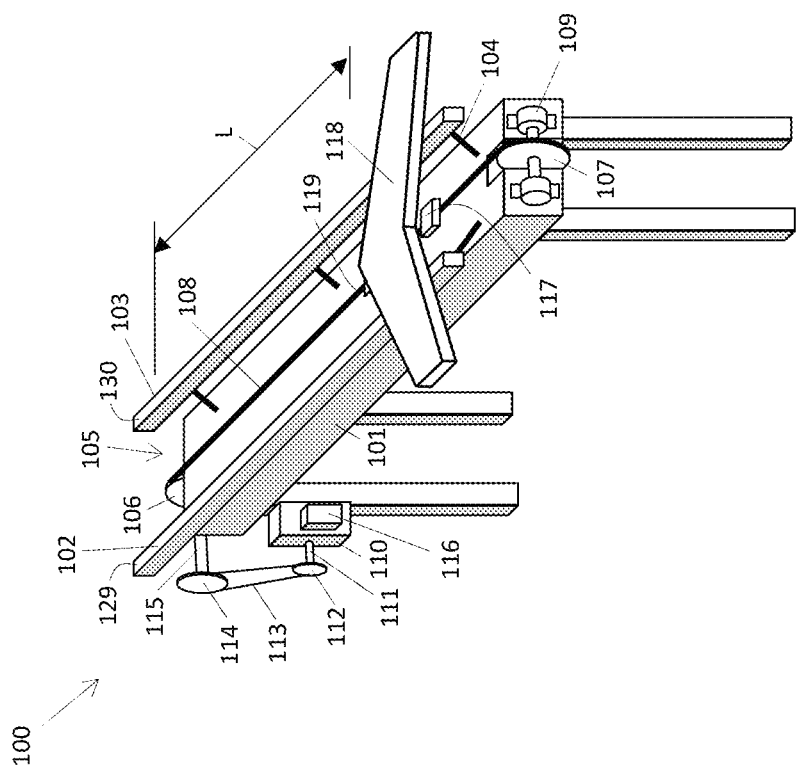
FIG. 1 illustrates an embodiment of the UAV launcher.

An embodiment of the UAV launcher designated the Automated Multi-Plane Propulsion System (AMPPS) is generally illustrated as AMPPS 100 at FIG. 1. Generally, AMPPS 100 comprises a launcher frame 101 with a first rail guide 102 and a second rail guide 103 coupled to the launcher frame. Typically, first rail guide 102 and second rail guide 103 are substantially parallel to one another and rigidly attached to launcher frame 101 either directly or through support members such as 104, and additionally comprise first rail surface 129 and second rail surface 130 respectively. AMPPS 100 further comprises a conveyor system generally illustrated as 105 and comprising a driver wheel 106, a driven wheel 107, and a conveyor 108 engaging driver wheel 106 and driven wheel 107. Typically driver wheel 106 and driven wheel 107 rotate on axes generally perpendicular to first rail guide 102 and second rail guide 103, and conveyor 108 is substantially perpendicular to first rail guide 102 and second rail guide 103. Driver wheel 106 and driven wheel 107 are coupled to launcher frame 101 typically through bearings supporting the sprockets and rigidly attached to launcher frame 101, such as bearing 109 attached to launcher frame 101 and supporting driven wheel 107.

The conveyor system 105 may be any system comprising a driven wheel which imparts a tangential velocity to a contacting conveyor, where the conveyor is a flexible assembly or material looped around both the driver wheel and the driven wheel. For example, the conveyor system may be a chain drive comprising a transmission chain, driver sprocket, and driven sprocket, or may be a belt drive comprising a transmission or conveyor belt, a driver pulley, and a driven pulley, or other similar system known in the art. See e.g., Peter R. N. Childs, *Mechanical Design* ($2^{nd}$ ed., 2004), among others. In a particular embodiment, conveyor system 105 is a chain drive and conveyor 108 is an ANSI 40 roller chain, and driver wheel 106 and driven wheel 107 are six inch sprockets having about 40 teeth.

AMPPS 100 further comprises a DC motor 110 coupled to driver wheel 106 such that rotation of DC motor 110 generates rotation of driver wheel 106. For example, at FIG. 1, DC motor 110 drives shaft 111 fixably attached and rotating primary gear 112. Primary gear 112 engages power chain 113, which drives secondary gear 114. Secondary gear 114 is fixably attached to power axle 115, which aligns with the axis of driver wheel 106 and acts to generate rotation of driver wheel 106. In combination the components act to generate rotation of driver wheel 106 at a rate proportional to the speed of DC motor 110. It is understood that the arrangement at FIG. 1 is exemplary only and any combination of components whereby the RPM of driver wheel 106 is proportional to the RPM of DC motor 110 may be utilized, such as a gearbox, a drive belt system, or other means known in the art. Through this arrangement, the RPM of DC motor 110 governs the RPM of drive sprocket 106, and correspondingly governs the linear velocity of conveyor 108. In a particular embodiment, DC motor 110 is a MOTENERGY ME1004 DC motor.

AMPPS 100 is utilized to provide rapid launch of UAVs in relatively quick succession. Toward this end, AMPPS 100 further comprises wedge interface 117 coupled to conveyor 108. In a particular embodiment, wedge interface 117 is fixably attached to conveyor 108. In certain embodiments, AMPPS additionally comprises a nose hold-down device 119. In operation, a UAV 118 loaded on AMPPS 100 and placed in contact with wedge interface 117 and nose hold-down device 119 when present. UAV 118 typically has a wingspan such that each wing extends over a rail guide, as illustrated. DC motor 110 is utilized to generate a linear velocity of conveyor 108 and cause wedge interface 117 to motivate UAV 118 over first rail guide 102 and second rail guide 103 from rest to a specific launching velocity, at which point UAV 118 ejects from AMPPS 100 and achieves airborne operation.

UAVs typically have minimum launching parameters required for successful launch, such as a minimum launching velocity or a maximum acceleration experienced over a launching length. For example, at FIG. 1, successful launch of UAV 118 might require a launching velocity of at least 35 miles-per-hour (MPH) over a launching length illustrated as L, where UAV 118 achieves the launching velocity over the launching length in a manner which limits maximum acceleration to less than about four Gs. For compactness and portability, the launching length might be some length less than about 12 feet. AMPPS 100 provides this particular functionality by utilizing motor controller 116, electrically connected to DC motor 110. Motor controller 116 is configured to control the RPM of DC motor 110 using a motor speed profile to ultimately control the linear velocity of conveyor 108 in order to provide a launching velocity over the launching length L, while additionally observing acceleration limits which may be applicable.

Figure 2:
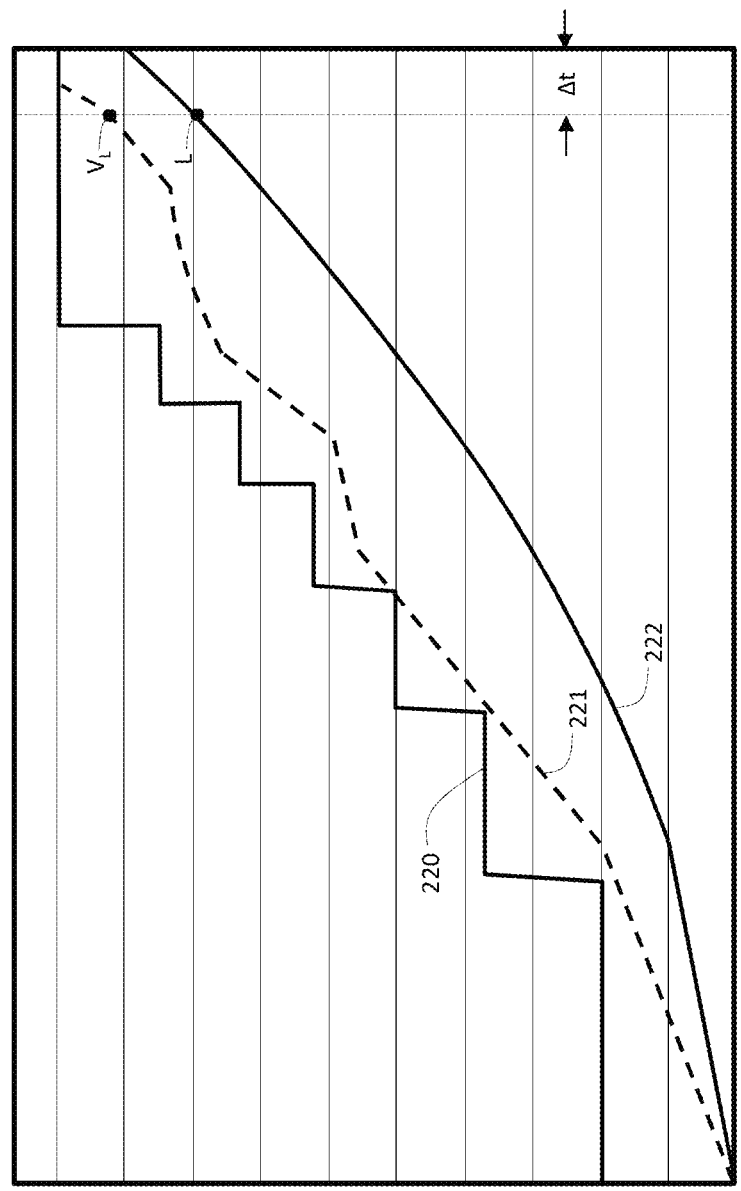
FIG. 2 illustrates an embodiment of a motor speed profile.

As an example, FIG. 2 illustrates an exemplary motor speed profile implemented by motor controller 116 on DC motor 110 comprising AMPPS 100 in order to achieve a specific launch velocity $V_L$ from rest and over a launching length L of about 8 feet. At FIG. 2, motor speed profile 220 indicates the speed of DC motor 110 commanded by motor controller 116 as a function of time, and expressed as a percentage from 0% to 100%. As indicated, motor speed profile describes a stepped-increase in motor speed, commencing with a commanded motor speed of about 20% at time 0. Velocity profile 221 illustrates the resulting linear velocity of conveyor 108 as a result of DC motor 110 generating driver wheel 106 rotation as discussed. Displacement profile 222 represents the displacement of, for example, wedge interface 117 over the launching length L of about 8 feet. As indicated, for the configuration and proportional relationships established among DC motor 110, driver wheel 106, conveyor 108, and other components of AMPPS 100, configuring motor controller 116 to command the speed of DC motor 110 according to motor speed profile 220 results in achieving the launch velocity $V_L$ over the launching length L. At FIG. 2, the eight different commands issued by motor controller 110 and describing motor speed profile 220 act to step up the motor's torque in small increments over the launching length L in order to achieve the launch velocity $V_L$ in a manner which ensures that an attached UAV does not experience acceleration forces in excess of generally three to four Gs. The result is a set of incremental, controlled increases in the actual speed of the roller chain and an attached UAV during launch. Further, as indicated at FIG. 2, in an embodiment motor controller 116 allows DC motor 110 to run for a pre-established amount of time Δt following UAV launch before issuing a command for a motor speed of 0%, in order to trigger the system to decelerate and stop with conveyor 108 and wedge interface 117 located near the beginning of launch rails 102 and 103. See Patrick Alan Livesay, "Investigation of Capabilities and Technologies Supporting Rapid UAV Launch System Development," (M.S.thesis, Naval Postgraduate School, 2015), and see Raymond L. Davis, "Mechanical Design and Optimization of Swarm-capable UAV Launch Systems," (M.S.thesis, Naval Postgraduate School, 2015), which are incorporated in their entirety.

Figure 3:
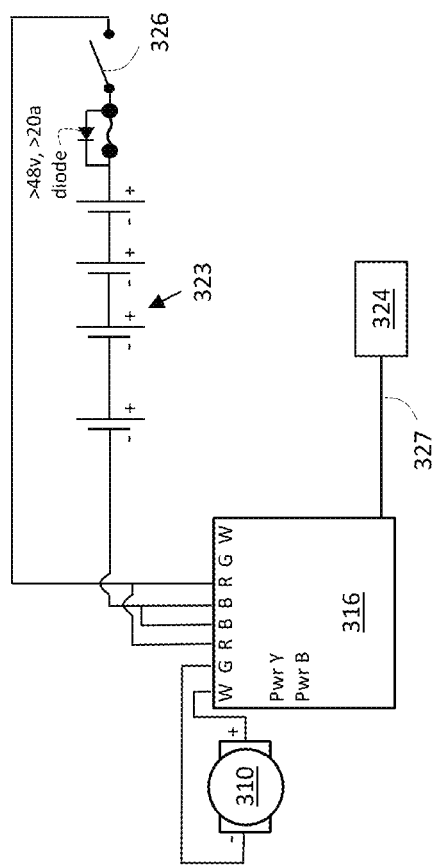
FIG. 3 illustrates an embodiment of an intelligent motor controller.

AMPPS 100 may use any motor controller capable to commanding motor speed as a function of time in order to increase the RPM of the DC motor to generate a linear velocity of the wedge interface equal to a launching velocity as the wedge interface displaces a distance equal to a launching length. In some embodiments, the motor controller is a digital device capable of executing instructions input by software programming, such as a ROBOTEQ HDC2460S controller or a substantially equivalent device. A particular embodiment is illustrated at FIG. 3. At FIG. 3, when main switch 326 is placed in the closed position, main DC power is provided from batteries generally indicated at 323 to intelligent motor controller 316. With software initialized, intelligent motor controller 316 awaits commands from computer system 324 received via, for example, a USB cable connection such as 327. When given a speed command is received, ordered in terms of for example percent power, intelligent motor controller 316 supplies the appropriate voltage to the DC motor 310. This continues until intelligent motor controller 316 receives a different speed command from computer system 324 or until main power switch 326 is opened. Motor controllers such as the aforementioned ROBOTEQ HDC2460S may be configured by users to facilitate nearly infinite control over the operation of any attached motors using programming methods known to those skilled in the art. Functions such as acceleration rate, deceleration rate, maximum operating voltage, maximum operating current, and dual-motor signal mixing are all available and easily configurable. As a result, a motor speed profile generating a velocity profile such 221 at FIG. 2 may be achieved through specification of stepped motor speeds as is indicated by motor speed profile 220, or may be achieved through other available descriptions of motor speed such as acceleration rate, or through combinations thereof. Any series of instructions by which the speed of DC motor 110 varies in order to motivate wedge interface 117 to achieve a specified launching velocity from rest over a launching length L is sufficient within this disclosure. Additionally, when this disclosure refers to achieving a specified launching velocity by wedge interface 117, it is understood that the specified launching velocity may be achieved by an unloaded wedge interface or a wedge interface acting on, for example, a loaded UAV. Additionally, an automatic reset function may be facilitated through software timing in decelerate and stop conveyor 108 and wedge interface 117 near the beginning of launch rails 102 and 103, as previously discussed. For example, the automatic reset may function such that during the time interval Δt of FIG. 2 and following launch, wedge interface 417 of FIG. 4C travels on conveyor 408 from a longitudinal position A on $L_C$ to come to rest generally at a longitudinal position B on $L_C$, in order to facilitate rapid loading and launching of multiple UAVs in succession.

In a particular embodiment, the motor speed profile defines the RPM of the DC motor as a function of time such that RPM=f(t) over an interval from an initial RPM to a final RPM. In another embodiment, the initial RPM is zero and the final RPM is an RPM that displaces the wedge interface at a rate equal to the launch velocity. In a further embodiment, the motor speed profile is an increasing function such that $f(t_2) \geq f(t_1)$ for all $t_2 > t_1$. In another embodiment, the motor speed profile is a strictly increasing function and $f(t_2) > f(t_1)$ for all $t_2 > t_1$. In a still further embodiment the derivative $f'(t) \geq 0$ over the interval, and another embodiment, f'(t)≤$G_x$, where $G_x$ is an acceleration limit. In some embodiments the final RPM displaces the wedge interface at a rate of at least 30 MPH and $G_x$ is an acceleration of the motor shaft which generates an acceleration of the wedge interface equal to 4 g's.

Figure 4B:
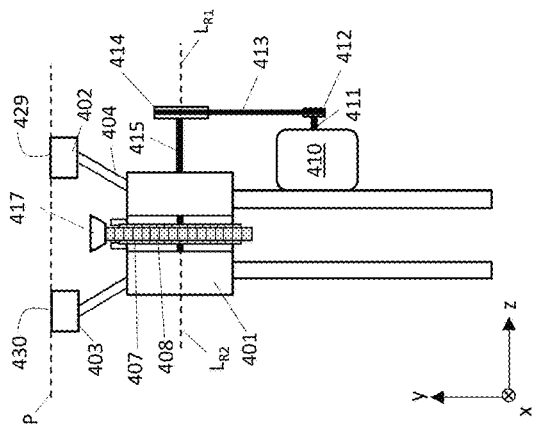
FIG. 4B illustrates a second view of an embodiment of the UAV launcher.
Figure 4A:
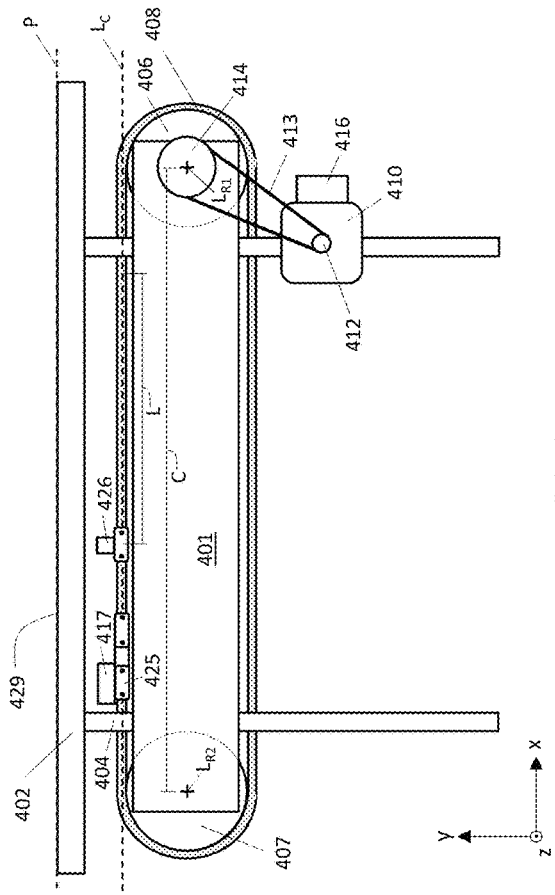
FIG. 4A illustrates a first view of an embodiment of the UAV launcher.
Figure 4C:
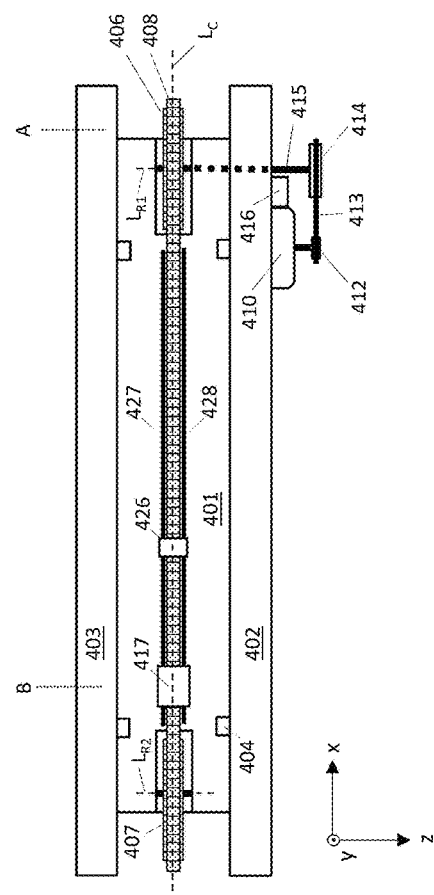
FIG. 4C illustrates a third view of an embodiment of the UAV launcher.

FIGS. 4A, 4B, and 4C illustrate an alternate embodiment of AMPPS 100, with views according to the axes shown. As shown at 4A, 4B, and 4C, first rail guide 402 and second rail guide 403 are fixably attached to launcher frame 401 through support members such as 404, and a conveyor system comprises driver wheel 406, driven wheel 407, and conveyor 408, with driver wheel 406 and driven wheel 407 coupled to launcher frame 401 through bearings. First rail surface 429 comprises first rail guide 402 and second rail surface 430 comprises second rail guide 403. Wedge interface 417 is coupled to one or more links 425 comprising conveyor 408. A nose hold-down device coupled to conveyor 408 is additionally illustrated as 426, as well as a chain guards 427 and 428 flanking conveyor 408 over some portion of launching length L. DC motor 410 drives shaft 411 in order to rotate primary gear 412 engaging power chain 413, which drives secondary gear 414 fixably attached to power axle 415 to generate rotation of driver wheel 406. Driver wheel 406 and driven wheel 408 rotate on axes $L_{R1}$ and $L_{R2}$ respectively, with $L_{R1}$ and $L_{R2}$ separated by a center distance C as indicated at FIG. 4A. Motor controller 416 issues commands to motor 410 in order to accelerate wedge interface 417 to a launching velocity over a launching length L, where the launching length L is less than the center distance C as indicated.

FIGS. 4A and 4B additionally illustrate a reference plane P parallel to the x-z plane of the axes shown and parallel to the center distance C, and a chain axis $L_C$ extending through a portion of conveyor 408 which extends at least over the launching distance L. In a particular embodiment, first rail guide 402, second rail guide 403, and some portion of conveyor 408 are generally aligned over the launching length L such that first rail surface 429 and second rail surface 430 are substantially co-planer with reference plane P over launching length L, and an axis of conveyor 408 over launching length L is substantially parallel to center distance C over the launching length L. Here, when a surface is "substantially co-planer" with a reference plane over some displacement X, this means that over the distance X, the surface is in-plane with the reference plane to within 0.05 X and more preferably to within 0.02 X. In a further embodiment, the portion of the conveyor 408 is between the center distance C and reference plane P. Additionally, in a particular embodiment, first rail guide 402 has a first axis which extends through first rail guide 402 over the launching length L and second rail guide 403 has a second axis which extends through second rail guide 403 over the launching length L, and the first axis and the second axis are substantially parallel. Here, when a first line and a second line are "substantially parallel" over some displacement X, this means that a first direction vector is parallel to the first line and a second direction vector is parallel to the second line, and the angle between the first direction vector and the second direction vector is less than 5 degrees, preferably less than 2 degrees, and more preferably less than 1 degree. In a further embodiment, the first axis and the second axis are substantially parallel to the center distance C. In a still further embodiment, the reference plane P is substantially parallel to center distance C. Here, when a plane is substantially parallel to a line, this means that a first direction vector is within the plane and co-planer with the line and a second direction vector is parallel to the line, and the angle between the first direction vector and the second direction vector is less than 5 degrees, preferably less than 2 degrees, and more preferably less than 1 degree. Similarly, when a first line is "substantially perpendicular" to a second line, this means that a first direction vector is parallel to the first line and a second direction vector is parallel to the second line, and the angle between the first direction vector and the second direction vector is at least 80 degrees and more preferably at least 85 degrees.

Figure 5B:
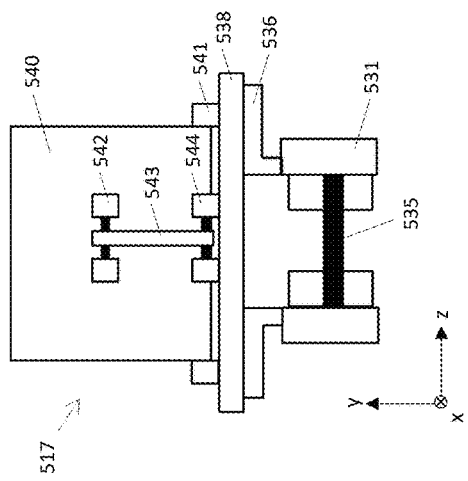
FIG. 5B illustrates a second view of an embodiment of a wedge interface.
Figure 5A:
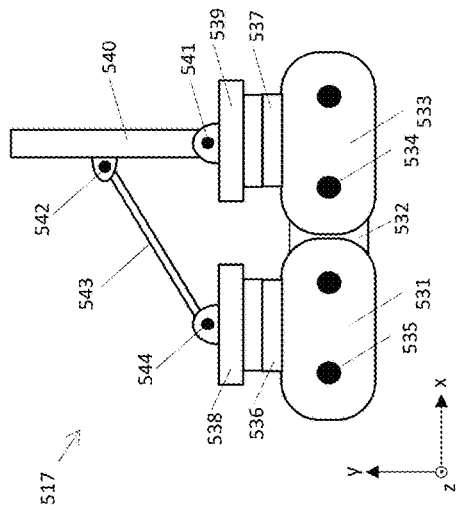
FIG. 5A illustrates a first view of an embodiment of a wedge interface.
Figure 6:
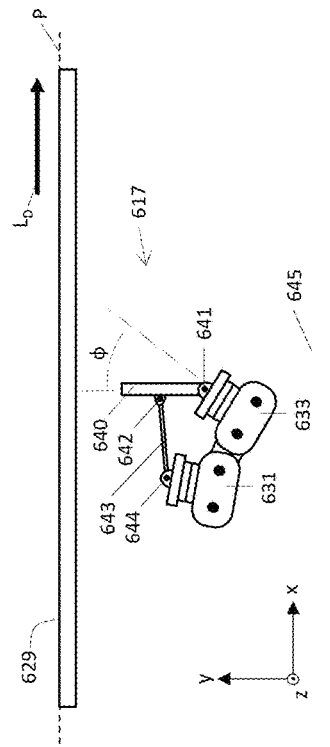
FIG. 6 illustrates an embodiment of the wedge interface pivoting over a pitch circle.

In typical embodiments, the first rail system and the second rail system extend beyond the driver wheel in an intended direction of launch. This constrains a launching UAV to continue in a direction generally parallel with the reference plane P when the conveyor extends around driver wheel 406 and contact between the UAV and wedge interface 417 is broken. In these embodiments, the wedge interface might be expected to rotate relative to the rail systems as the portion of the conveyor coupled to the wedge interface extends around the driven wheel. This can result in potential damage to a loaded UAV undergoing launch, as the wedge interface motivating the UAV begins to rotate while UAV translation is generally maintained parallel to reference plane P by the first and second rail systems. As a result, in some embodiments, the wedge interface comprises a pivoting plate coupled to the conveyor at a first conveyor section and comprising a first pivot point, a support member coupled to a section conveyor section and comprising at a second pivot point, and the support member coupled to the pivoting plate at a third pivot point. For example, a particular embodiment of the wedge interface useful for these embodiments is illustrated at FIGS. 5A and 5B with views in accordance with the axes shown, and illustrated with reference to an embodiment using a chain drive as the conveyor system. FIGS. 5A and 5B illustrate a wedge interface 517 fixably attached to a portion of a chain drive comprising pin links 531 and 533 coupled to roller link 532 through pins such as pin 534, and comprising other pins such as 535. Pin links 531 and 533 each comprise an outer plate fixably attached to the respective links and illustrated as 536 and 537. Such links are known in the art. See e.g., U.S. Tsubaki, Inc., *The Complete Guide to Chain* (1997), among others. At FIGS. 5A and 5B, wedge interface 517 comprises a first supporting platform 538 coupled to outer plate 536 of pin link 531 and a second supporting platform 539 coupled to outer plate 537 of pin link 533. A pivoting plate 540 is coupled to second supporting platform 539 through pivot joint 541, which allows rotation around the z-axis of FIGS. 5A and 5B. In a particular embodiment, pivoting plate 540 is substantially perpendicular to the first axis of first rail guide 402, and in another embodiment, substantially perpendicular to center distance D. Pivoting plate 540 further comprises pivot joint 542 coupled to support member 543 at a first end of support member 543. Support member 543 further couples to outer plate 538 through pivot joint 544. Similar to pivot joint 541, pivot joints 542 and 544 allow rotation about the z-axis. As a result, when a drive chain begins its extension around a driven sprocket and outer plates 538 and 539 correspondingly commence rotation around the rotation axis of the driven sprocket, the pivoting arrangement illustrated greatly mitigates changes to the relative orientation of pivoting plate 540 with respect to the y-z plane of FIGS. 5A and 5B. As a result, when wedge interface 517 acts to motivate a UAV through contact with pivoting plate 540 and the first and second rail systems extend beyond the driver wheel, pivoting plate 540 maintains the same general orientation with respect to the UAV until contact with the UAV is disestablished, avoiding UAV damage which might otherwise occur. As an example, FIG. 6 illustrates wedge interface 617 coupled to chain links 631 and 633 as a drive chain commences extension around a driver sprocket, where the driver sprocket is represented by pitch circle 645. At FIG. 6, a first rail surface 629 and a second rail surface (not shown) are substantially co-planer with a reference plane P, so that any object such as a UAV being motivated by pivoting plate 640 and extending over first rail surface 629 and the second rail surface is generally constrained to continue displacement in the launching direction indicated by $L_D$ as long as contact with pivoting plate 640 continues. However, as the drive chain travels around pitch circle 645, the pivoting action of pivot joints 641, 642, and 644 in concert with support member 643 act to maintain the same general orientation of pivoting plate 640 relative to the y-axis and the launching direction $L_D$, rather than pivoting plate 640 assuming the orientation represented as $\phi$ that would otherwise be expected if wedge interface 617 were rigidly assembled. This pivoting action greatly mitigates potential damage which might otherwise occur to a loaded UAV undergoing launch.

Figure 7:
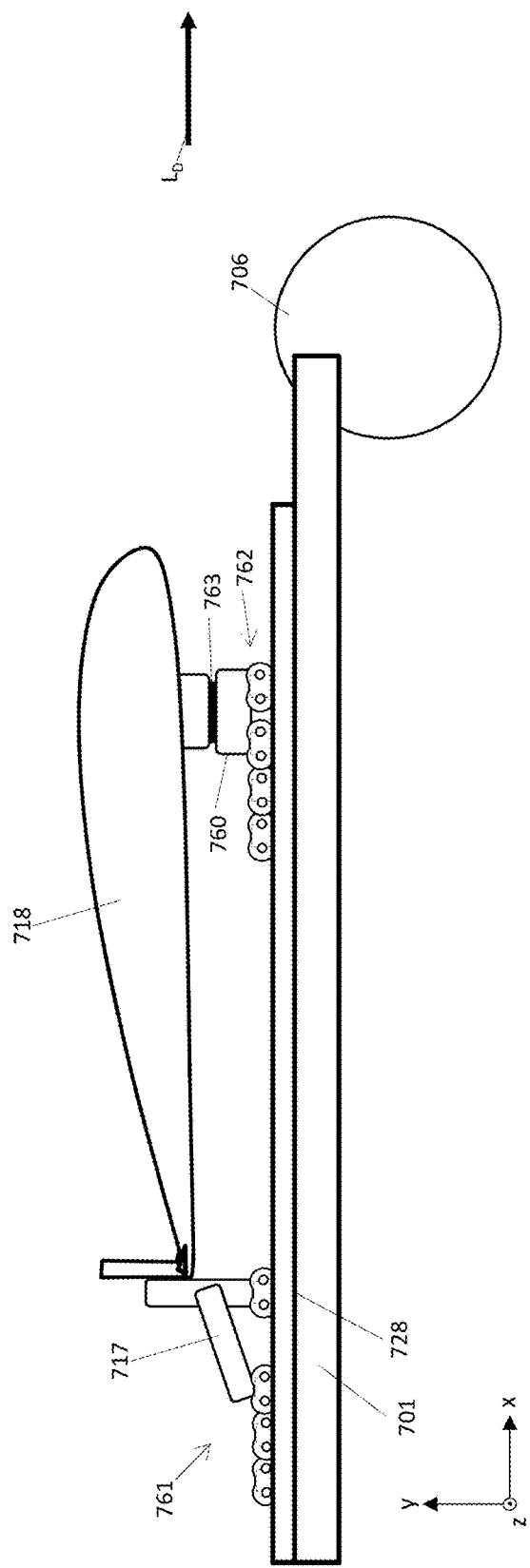
FIG. 7 illustrates an embodiment of a wedge interface and nose hold-down device.

As discussed, in some embodiments a nose hold-down device 426 is additionally present. The nose hold-down device functions to maintain the nose orientation of a UAV during launch. The nose hold-down device may be means sufficient to secure the UAV during a launching operation in order to mitigate pitching of the UAV's nose as the wedge interface and conveyor displaces over the launching distance. In some embodiments, the nose hold-down device utilizes a mushroom Velcro to mate with a loaded UAV. For example, FIG. 7 illustrates a section of an AMPPS launcher comprising foundation 701, chain guard 728, and driver wheel 706. UAV 718 is in contact with wedge interface 717 at an aft end and in contact with a nose hold-down device 760 at a forward end. Wedge interface 717 comprises a pivoting plate and is coupled to chain links 761 of a conveyor. Nose hold-down device 760 is similarly coupled to chain links 762. As illustrated, nose hold-down device 760 couples to the forward end of UAV 718 through a Velcro interface 763. As previously discussed, during launch as UAV 718 is pushed by wedge interface 717 in launch direction $L_D$ and held in place by nose hold-down device 760, first and second rail guides (not shown) constrain UAV 718 translation to generally the launch direction $L_D$. In embodiments where the first and second rail guides extend beyond driver wheel 706 as is typical, the motion of the conveyor and correspondingly wedge interface 717 and nose hold-down device 760 generally follow the pitch circle of driven wheel 706, and contact between UAV 718, wedge interface 717, and nose-hold-down device 760 is broken as UAV 718 continues in the launch direction $L_D$.

Figure 8A:
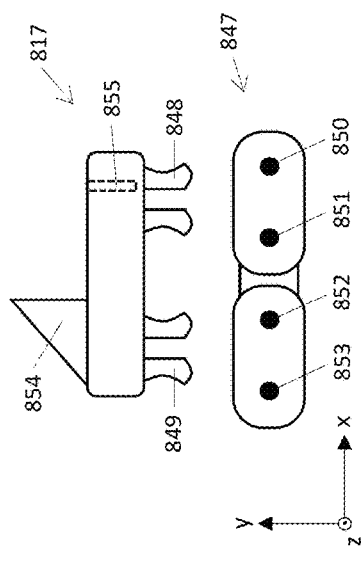
FIG. 8A illustrates another embodiment of a wedge interface and conveyor.
Figure 8B:
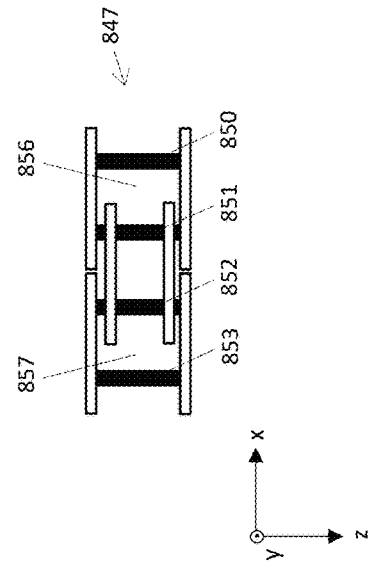
FIG. 8B illustrates a second view of a conveyor.

An alternate embodiment of a wedge interface or nose hold-down device is illustrated at FIG. 8A as interface 817. Interface 817 couples to drive chain 847 by inserting flexible legs 848 between pins 850 and 851 and inserting flexible legs 849 between pins 852 and 853, such that the flexible legs respectively fit into and conform with space 856 and space 857 of FIG. 8B. In this particular embodiment typically flexible legs 849 and 850 are pushed from spaces 856 and space 857 and decoupled from the conveyor by the teeth of a driver sprocket as the drive chain extends around the driver sprocket. An advantage of interface 817 is that interface 817 is not fixably attached to the drive chain conveyor, so that interface 817 may be easily coupled with any links on the drive chain conveyor. As stated, interface 817 may be utilized as a wedge interface or nose hold-down device and may be configured appropriately to provide, for example, an element 854 intended to motivate a UAV by pushing, a recess 855 for insertion of a nose hook, or some combination thereof.

The disclosure also provides a system for launching a UAV comprising the AMPPS described and further comprising a UAV. The UAV comprises a first wing and a second wing and is in contact with the wedge interface. Additionally, the first rail guide of the AMPPS is interposed between the first wing and the conveyor, and the second rail guide of the AMPPS is between the second wing and the conveyor. The DC motor rotates the motor shaft at a motor shaft RPM and the motor shaft generates a driver wheel RPM, with the driver wheel RPM proportional to the motor shaft RPM and generating a linear velocity of the conveyor. The linear velocity produces a linear velocity of an individual chain link to which the wedge interface is coupled. Additionally, an intelligent motor controller increases the motor shaft RPM using a motor speed profile, where the motor speed profile begins at zero RPM and subsequently increases the motor shaft RPM to generate the linear velocity of the individual chain link equal to the launching velocity as the individual chain link displaces a distance equal to the launching length. This correspondingly displaces the wedge interface and the UAV to the launching velocity over the launching length.

In some embodiments, AMPPS 100 comprises a plurality of wheels mounted to the launcher frame. In further embodiments, AMPPS 100 comprises a motorized mobility system comprising at least two DC motors and gearboxes installed, for example, on the launching end of AMPPS 100. In particular embodiments the DC motors are wired to a battery array, and a second intelligent motor controller provides fine-control over the acceleration and speeds of the wheel motors. The system may further comprise a wireless control system allowing the launcher to be remotely driven and operated at distance, adding overall mobility and range capability.

In further embodiments, a computer system comprising AMPPS 100 may be configured to detect environmental parameters, such as wind speed and direction, either from sensors incorporated within AMPPS 100 or through communication with an external system publishing real-time weather data to the web. In some cases the computer system may be configured to re-orient AAMPS 100 based on prevailing conditions such as wind speed and direction. Further, additional sensors such as /acGPS modules may be present with "nofly" zones mapped in their software in order to ensure safe launches.

AMPPS 100 may additionally incorporate the ability to detect personnel and objects in the vicinity of the launch area. For example, in some embodiments AMPPS 100 comprises sonar sensors and the computer system is configured to prevent launch when objects are located within a certain vicinity. In another embodiment, AMPPS 100 has the ability to both communicate the presence of a loaded UAV as well as identify the specific aircraft loaded. For example, AMPPS 100 may incorporate "detect" and "Identify" functions for a loaded UAV using a Phidgets RFID reader and RFID tags present on the loaded UAV. See Livesay, (M.S.thesis, Naval Postgraduate School, 2015), and see Davis, (M.S.thesis, Naval Postgraduate School, 2015).

Thus, provided here is a UAV launcher generally comprising a launcher frame, first rail guide, second rail guide, and a conveyor system comprising a conveyor, where the first rail guide, second rail guide, and some portion of the conveyor are typically substantially parallel, and where the first and second rail guide typically extend beyond the driver wheel of the conveyor system in a launching direction. Typically, the driver wheel and driven wheel of the conveyor system rotate on axes generally perpendicular to the first and second rail guide. A DC motor is coupled to the driver wheel and generates rotation of the driver wheel, and correspondingly governs the linear velocity of the conveyor. A motor controller is configured to control the RPM of DC motor using a motor speed profile to ultimately control the linear velocity of the conveyor to provide a launching velocity over the launching length L, while additionally observing acceleration limits. A wedge interface is coupled to the transmission drive and utilized to motivate a UAV to the launching velocity during launch, such that the UAV ejects from the UAV launcher and achieves airborne operation.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A UAV launcher comprising:
   a launcher frame;
   a first rail guide and a second rail guide coupled to the launcher frame;
   a conveyor system comprising a driver wheel, a driven wheel, and a conveyor engaging the driver wheel and the driven wheel, where the conveyor system is between the first rail guide and the second rail guide, and where an axis of the driver wheel is displaced from an axis of the driven wheel by a center distance;
   a wedge interface coupled to the conveyor;
   a DC motor having a motor shaft and the motor shaft coupled to the driver wheel where an RPM of the motor shaft generates a proportional RPM of the driver wheel and generates a linear velocity of the conveyor engaging the driver wheel and generates the linear velocity of the wedge interface coupled to the conveyor;
   a motor controller electrically coupled to the DC motor and configured to increase the RPM of the motor shaft using a motor speed profile, where the motor speed profile begins at zero RPM and subsequently increases the RPM of the motor shaft to generate the linear velocity of the wedge interface equal to a launching velocity as the wedge interface displaces a distance equal to a launching length, where the launching length is less than or equal to the center distance.

2. The UAV launcher of claim 1 where the first rail guide comprises a first rail surface and the second rail guide comprises a second rail surface, and where the first rail surface and the second rail surface are substantially coplanar with a reference plane over the launching length, where the reference plane is parallel to the center distance, and where a portion of the conveyor between the driven wheel and the driver wheel is substantially parallel to the center distance, and where the wedge interface is coupled to the portion of the conveyor between the driven wheel and the driver wheel and the wedge interface is between the reference plane and the portion of the conveyor between the driven wheel and the driver wheel.

3. The UAV launcher of claim 2 where the first rail guide and the second rail guide extend beyond the driver wheel in a launching direction, where the launching direction is a direction from the driven wheel to the driver wheel and parallel to the center distance.

4. The UAV launcher of claim 3 where a first axis extends through the first rail guide over the launching length and where a second axis extends through the second rail guide over the launching length, and where the first axis and the second axis are substantially parallel to the center distance.

5. The UAV launcher of claim 3 where the portion of the conveyor between the driven wheel and the driver wheel is between the center distance and the reference plane.

6. The UAV launcher of claim 5 where the wedge interface comprises a pivoting plate coupled to the conveyor at a first conveyor section and comprising a first pivot point, a support member coupled to a section conveyor section and comprising at a second pivot point, and the support member coupled to the pivoting plate at a third pivot point.

7. The UAV launcher of claim 1 where the motor speed profile proscribes a plurality of speeds of the DC motor where the plurality of speeds is a stepped increase of DC motor speeds over a time interval $\Delta t$, where the time interval $\Delta t$ is an elapsed time required for the wedge interface to displace the distance equal to the launching length and achieve the linear velocity equal to the launching velocity.

8. The UAV launcher of claim 7 where the motor controller is an intelligent motor controller comprising a processor where the processor is programmed to proscribe the plurality of speeds.

9. The UAV launcher of claim 1 where the motor controller is an intelligent motor controller comprising a processor where the processor is programmed to communicate the motor speed profile to the DC motor, where the motor speed profile defines the RPM of the motor shaft as a function of time over a time interval $\Delta t$ and from an initial RPM to a final RPM, where the initial RPM is zero and the final RPM is the RPM of the motor shaft to generate the linear velocity of the wedge interface equal to the launching velocity.

10. The UAV launcher of claim 9 where the motor speed profile is an increasing function.

11. The UAV launcher of claim 10 where a derivative of the motor speed profile with respect to time over the time interval $\Delta t$ is greater than or equal to zero.

12. The UAV launcher of claim 11 where the time interval $\Delta t$ is less than one second and where the final RPM displaces the wedge interface at a rate of at least 30 MPH and where the derivative of the motor speed profile with respect to time over the time interval $\Delta t$ is less than or equal to an acceleration limit $G_x$, where $G_x$ is an acceleration of the RPM of the motor shaft which generates an acceleration of the wedge interface equal to 4g's.

13. A UAV launcher comprising:
    a launcher frame;
    a conveyor system comprising a driver wheel, a driven wheel, and a conveyor engaging the driver wheel and the driven wheel, where the conveyor system is between the first rail guide and the second rail guide, and where an axis of the driver wheel is displaced from an axis of the driven wheel by a center distance and where a portion of the conveyor between the driver wheel and the driven wheel is substantially parallel to the center distance;
a first rail guide and a second rail guide coupled to the launcher frame, where the first rail guide comprises a first rail surface and the second rail guide comprises a second rail surface, and where the first rail surface and the second rail surface are substantially coplanar with a reference plane over the launching length, where the reference plane is parallel to the center distance and where the portion of the conveyor between the driver wheel and the driven wheel is between the center distance and the reference plane, and where the first rail guide and the second rail guide extend beyond the driver wheel in a launching direction, where the launching direction is a direction from the driven wheel to the driver wheel and parallel to the center distance;
a wedge interface coupled to the conveyor; where the wedge interface is coupled to the portion of the conveyor between the driven wheel and the driver wheel and the wedge interface is between the reference plane and the portion of the conveyor between the driven wheel and the driver wheel;
a DC motor having a motor shaft and the motor shaft coupled to the driver wheel where an RPM of the motor shaft generates a proportional RPM of the driver wheel and generates a linear velocity of the conveyor engaging the driver wheel and generates a linear velocity of the wedge interface coupled to the chain link comprising the conveyor;
an intelligent motor controller comprising a processor and electrically coupled to the DC motor, where the intelligent motor controller is configured to increase the RPM of the motor shaft using a motor speed profile, where the motor speed profile defines the RPM of the motor shaft as a function of time over a time interval Δt and from an initial RPM to a final RPM, where the initial RPM is zero and the final RPM is the RPM of the motor shaft that the linear velocity of the wedge interface equal to a launching velocity when the wedge interface displaces a distance equal to a launching length, where the launching length is less than or equal to the center distance.

14. The UAV launcher of claim 13 where the motor speed profile is an increasing function.

15. The UAV launcher of claim 14 where the wedge interface comprises a pivoting plate coupled to the conveyor at a first conveyor section and comprising a first pivot point, a support member coupled to a section conveyor section and comprising at a second pivot point, and the support member coupled to the pivoting plate at a third pivot point.

16. The UAV launcher of claim 14 where a first axis extends through the first rail guide over the launching length and where a second axis extends through the second rail guide over the launching length, and where the first axis and the second axis are substantially parallel to the center distance.

17. A system for launching a UAV comprising:
a launcher frame;
a conveyor system comprising a driver wheel, a driven wheel, and a conveyor engaging the driver wheel and the driven wheel, where the conveyor system is between the first rail guide and the second rail guide, and where an axis of the driver wheel is displaced from an axis of the driven wheel by a center distance and where a portion of the conveyor between the driver wheel and the driven wheel is substantially parallel to the center distance;
a first rail guide and a second rail guide coupled to the launcher frame, where the first rail guide comprises a first rail surface and the second rail guide comprises a second rail surface, and where the first rail surface and the second rail surface are substantially coplanar with a reference plane over the launching length, where the reference plane is parallel to the center distance and where the portion of the conveyor between the driver wheel and the driven wheel is between the center distance and the reference plane, and where the first rail guide and the second rail guide extend beyond the driver wheel in a launching direction, where the launching direction is a direction from the driven wheel to the driver wheel and parallel to the center distance;
a DC motor having a motor shaft and rotating the motor shaft at a motor shaft RPM, and the motor shaft coupled to the driver wheel and generating a driver wheel RPM, where the driver wheel RPM is proportional to the motor shaft RPM, and the driver wheel RPM generating a linear velocity of the conveyor engaging the driver wheel;
a wedge interface coupled to the conveyor and the conveyor displacing the wedge interface at the linear velocity of the conveyor engaging the driver wheel;
an intelligent motor controller comprising a processor and electrically coupled to the DC motor and increasing the motor shaft RPM using a motor speed profile, where the motor speed profile begins at zero RPM and subsequently increases the motor shaft RPM to generate the linear velocity of the conveyor equal to a launching velocity as the wedge interface displaces a distance equal to a launching length, where the launching length is less than or equal to the center distance;
the UAV, where the UAV comprises a first wing and a second wing, and the UAV positioned to be in contact with the wedge interface and positioned such that the first rail guide is between the first wing of the UAV and the conveyor system and the second rail guide is between the second wing of the UAV and the conveyor system, and the wedge interface displacing the UAV at the linear velocity of the individual chain link in the launching direction.

18. The system of claim 17 the wedge interface comprises a pivoting plate coupled to the conveyor at a first conveyor section and comprising a first pivot point, a support member coupled to a section conveyor section and comprising at a second pivot point, and the support member coupled to the pivoting plate at a third pivot point.

19. The system of claim 17 where a first axis extends through the first rail guide over the launching length and where a second axis extends through the second rail guide over the launching length, and where the first axis and the second axis are substantially parallel to the center distance.

* * * * *